United States Patent [19]

Quelle, Jr.

[11] 4,185,888
[45] Jan. 29, 1980

[54] CRYPTOGRAPHIC SYSTEM EMPLOYING OPTICAL SCRAMBLING ARRAYS

[76] Inventor: Fred W. Quelle, Jr., 8 Garden Ct., Cambridge, Mass. 02138

[21] Appl. No.: 225,402

[22] Filed: Sep. 21, 1962

[51] Int. Cl.² .................... G02B 5/16; G09C 1/00
[52] U.S. Cl. .................................. 350/96.25; 35/3
[58] Field of Search ................... 35/2, 3; 88/1 LC

[56] References Cited

U.S. PATENT DOCUMENTS

| | | | |
|---|---|---|---|
| 2,992,516 | 7/1961 | Norton | 88/1 |
| 3,125,812 | 3/1964 | Simpson | 88/1 |
| 3,145,247 | 8/1964 | Meltzer | 88/1 |

*Primary Examiner*—Verlin R. Pendegrass
*Attorney, Agent, or Firm*—R. S. Sciascia; L. I. Shrago

EXEMPLARY CLAIM

1. A system for coding optical images comprising, in combination, first and second geometric arrays of light-conducting elements, similar elements of each array being scrambled in a random fashion such that the respective ends of these conductors occupy different relative positions at both ends of the array, said arrays being coupled end to end, and means for varying the position of one of said arrays with respect to the other whereby an image passing through said arrays is subjected to different coding in each of said arrays.

11 Claims, 10 Drawing Figures

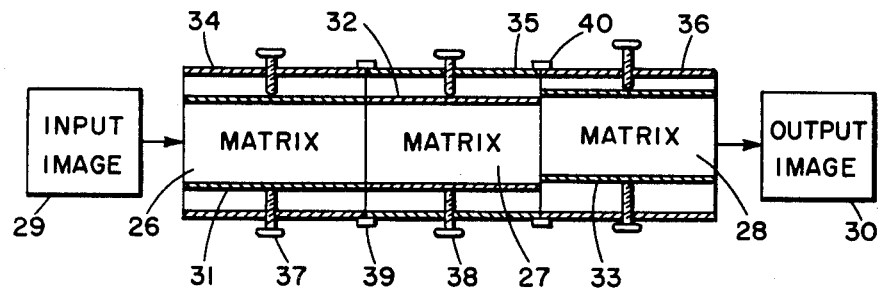
Fig. 5
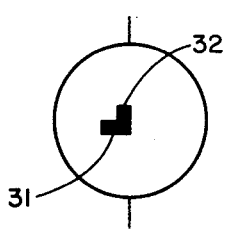 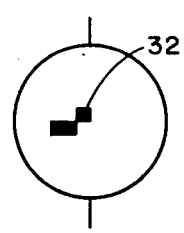 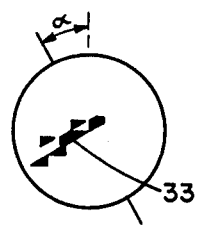
Fig. 6  Fig. 7  Fig. 8
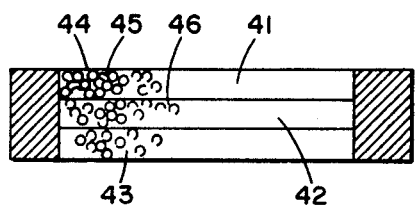
Fig. 9
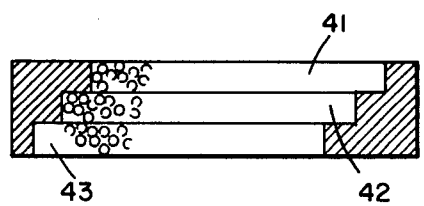
Fig. 10

CRYPTOGRAPHIC SYSTEM EMPLOYING OPTICAL SCRAMBLING ARRAYS

The invention described herein may be manufactured and used by or for the Government of the United States of America for governmental purposes without the payment of any royalties thereon or therefor.

The present invention relates generally to apparatus for and methods of coding intelligence and, more particularly, to a cryptographic system employing fiber optical principles to encipher and decipher two-dimensional pictorial displays.

It is well known that optical images can be transmitted through matrices made up of light-conducting members. If the elements of such a matrix do not occupy corresponding positions at both ends of the array, then distortion results. Optical scramblers of one type take advantage of this degradation by deliberately rearranging one end of the light-conducting elements in a random manner until the transmitted image becomes unrecognizable.

To construct a scrambler for use in such coding systems, it is only necessary to hold one end of the optical array fixed or otherwise restrain the movement of the light conductors at this end and arbitrarily shift the positions of the other end of the elements. An image projected onto one end of such a scrambler will appear at the other end in an unrecognizable form. This encoded display can be processed by any information handling system and, thereafter, the original image can be reconstructed by simply transmitting it or viewing it through the same scrambler but in a direction opposite to that in which it was initially sent.

This basic technique for enciphering and deciphering pictorial information cannot be utilized conveniently where relatively large amounts of material must be quickly processed. One of the reasons for this is that there is no simple method for manufacturing more than one pair of identically scrambled matrices. Such a pair, it would be mentioned, can be formed by constraining both ends of a coherent array, then rearranging the positions of the light-conducting elements at various intermediate points in a random fashion and then cutting the array in two. Since this yields only two identical scramblers, optical coding systems of this general sort cannot be employed in applications where the process must be carried out at widely separated geographical locations. Moreover, cryptographic systems resorting to optical coders of the type just described have little flexibility for the coding schedule cannot be changed or modified without replacing all of the scramblers.

Optical scramblers having their light-conducting elements slued laterally either to the right or the left by fixed amounts are available in the prior art. These scramblers are used in banking operations for coding the depositor's signature. Although this type of scrambler does expand considerably the versatility of these systems by making numerous identical scramblers available, nevertheless, it does not possess a degree of coding sufficient to satisfy the stringent demands encountered in the transmission or storage of highly classified material. Furthermore, even with this type of scrambler, there is no provision whereby the coding sequence can be changed once the matrix has been fabricated. Thus, the integrity of the cryptographic system can be destroyed by analyzing the performance and construction of any one scrambler.

It is accordingly a primary object of the present invention to provide a method for enciphering and deciphering two-dimensional displays which employs fiber optical principles.

It is another object of the present invention to provide a cryptographic system wherein reproducible optical scramblers are utilized.

A still further object of the present invention is to provide a cryptographic system for enciphering pictorial information wherein the coding means comprises a group of serially arranged matrices made up of light-conducting members.

A yet still further object of the present invention is to provide a cryptographic system wherein each scrambling device comprises a plurality of similarly constructed optical arrays the orientation of which can be altered to compound the coding possibilities.

A yet still further object of the present invention is to provide a cryptographic system employing fiber optical principles which possesses an extremely high degree of secrecy.

A still further object of the present invention is to provide an optical coding arrangement utilizing matrices of light-conducting members wherein the coding schedule can be readily changed by simple adjustments.

A yet still further object of the present invention is to provide an optical scrambling system utilizing serially connected arrays of light-transmitting members which cannot be broken by analyzing the construction of any one coding component.

Other objects and many of the attendant advantages of this invention will be readily appreciated as the same becomes better understood by reference to the following detailed description when considered in connection with the accompanying drawings wherein:

FIG. 1 illustrates a randomly scrambled optical array made up of circular light-conducting elements;

FIG. 2, which is a view in the direction 2—2, shows the input side of the array with a simple image applied thereto;

Figure 3:
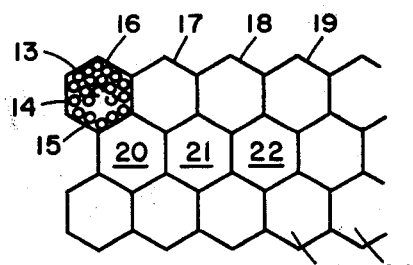
FIG. 3 shows in schematic form a portion of one end of a reproducible optical array made up of a multiplicity of hexagonal fiber bundles.
Figure 4:
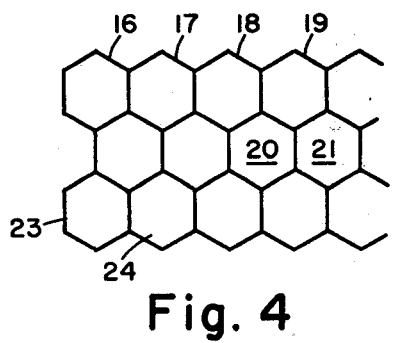
FIG. 4 shows a portion of the other end of the array of FIG. 3 with selected hexagonal fiber bundles thereof slued by predetermined amounts.

FIG. 5 schematically illustrates a cryptographic system employing three serially connected optical scramblers of the reproducible type shown in FIGS. 3 and 4;

FIG. 6 illustrates an input image used to describe the operation of the system of FIG. 5;

FIG. 7 illustrates the appearance of the input image of FIG. 6 after its passage through one coding matrix;

FIG. 8 illustrates the appearance of the input image of FIG. 6 after its passage through the second matrix which has been rotated through an angle α;

FIG. 9 illustrates a portion of one side of an alternative optical array which can be used in the system of FIG. 5; and FIG. 10 illustrates the other side of the array of FIG. 9 showing the displacements of selected rows thereof.

Figure 1:
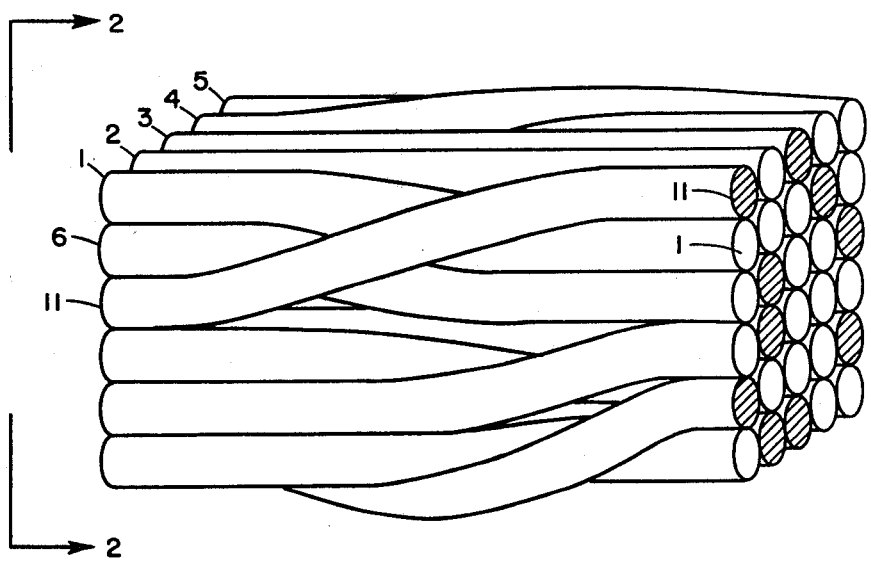

The basic method and apparatus for coding optical displays discussed hereinbefore may, perhaps, best be understood by referring now to FIG. 1 which illustrates a portion of a conventional optical scrambler made up of a multiplicity of light-conducting elements, such as 1, 2, 3, 4 and 5. Although this array or matrix has its constituent components arranged in rectangular symmetry, any other geometrical arrangement having a close-packed configuration may be employed.

Figure 2:
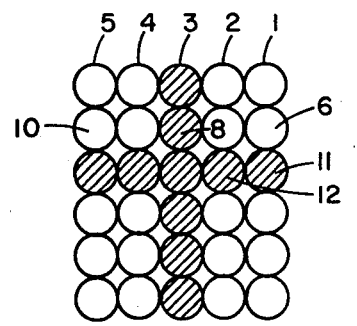

The coding operation merely involves projecting or otherwise superimposing the optical display onto the unscrambled end of the array, which end corresponds to the left-hand side of FIG. 1 and is depicted in FIG. 2. In order to simplify the description, this display is in the form of a simple cross. When this design is directed on the input side of the array, it illuminates the ends of certain conductors, such as 3, 8, 11 and 12. Since these conductors and various others have been arbitrarily rearranged such that their ends do not occupy corresponding positions at both sides of the array, the discrete portions of the input image intercepted by these conductors are relocated to different parts of the output display. In this connection, for example, the input end of conductor 1 occupies the first position in the top row of the array while the output end of this same conductor occupies the first position in the second row. Likewise, the input end of conductor 11 occupies the first position in the third row and the output end thereof occupies the first position in the top row. It will be appreciated that only the least involved transpositions are shown in this figure. Because of these random transpositions, the simple cross shape, as will be seen in FIG. 1, appears at the output or coded end of the array as a meaningless pattern, unrecognizable and having no discernible relationship to the input image.

The coded output pattern so produced may be processed by a wide variety of data handling systems without compromising the information involved. For example, the coded pattern can be read by an optical scrambler and converted into a sequence of electrical signals and these signals can be transmitted over ordinary communication channels to a remote location. To decipher this information, the encoded optical pattern is reconstructed from the electrical signals and then projected onto the coded end of an array identical to the one used in the coding operation. When this is done, the original image will reappear on the unscrambled end of the array. The limited utility of this method, as alluded to in the remarks, is due to the fact that only two identical scramblers can be readily fabricated.

In systems of this general type, it will thus be seen, the coding is performed by directing the image through an incoherent array in one direction, and the decoding is carried out by transmitting the coded pattern back through the same or an identical array in an opposite direction. The light-conducting members of these scramblers can be, for example, plastic or glass rods, fibers or other devices which have the capability of providing separated light transmission paths.

In an effort to expand somewhat the usefulness of optical coding systems of the type just described, optical scramblers have been devised which employ reproducible arrays. FIGS. 3 and 4 depict the input and output sides, respectively, of one such array in which each light conductor consists of a multiplicity of coherent optical fibers, such as 13, 14 and 15, bound or otherwise held together to form hexagonal elements, such as 16, 17 and 18. As depicted in these figures, one row of hexagonal elements, such as the top row in FIG. 3, may be fabricated in a coherent fashion with the ends of these elements occupying similar positions at each side of the array. However, the elements in the row directly beneath it, 20, 21 and 22, may be slued to the right, as seen in FIG. 4, so that the ends of these last-mentioned elements at the output side of the array are displaced from their input positions by two hexagonal elements. Similarly, the conductors in the third row, 23, 24, etc., may be slued to the left so that the output ends of these conductors are displaced from their input positions by, for example, three hexagonal elements. Since the conductors in the various horizontal rows are straight or slued either to the right or left by known amounts, a multiplicity of identical scramblers can be fabricated by simply reproducing these conditions as each array is constructed. It would be pointed out at this time that in order to make the array as compact as possible, each conductor can have its cross section altered at a point where it crosses over the conductors in the row immediately below it. Also, the sluing need not be different throughout the complete array but a given pattern may be repeated after every ten rows, for example.

The present invention in one preferred embodiment achieves a high degree of coding by utilizing a plurality of reproducible optical scramblers of the type just described in the same coding scheme. These arrays or matrices are connected in series and each can be rotated with respect to the others through any preselected angle. Also, each array may be displaced laterally with respect to a predetermined central longitudinal axis. This combination of angular rotation and lateral displacement enhances the complexity of the coding operation and increases the degree of coding that can be realized with a given number of similarly constructed arrays.

A coding arrangement of the type just described is schematically illustrated in FIG. 5. Here, three similar matrices 26, 27 and 28, each fabricated in accordance with the method shown in FIGS. 3 and 4, are connected in a series relationship. Hence, the image 29 projected on the input side of matrix 26 experiences three different scrambling operations before it appears as a final coded image 30 on the output side of matrix 28.

Although these matrices have the same general coding characteristic, the image has its appearance progressively changed as it passes through the system. This comes about because of the successive lateral displacement of each finite image area as it travels through the three differently slued light conductors that constitute its path through the complete system.

In order to further increase the degree of coding, each matrix is arranged so that it can be both rotated and laterally offset with respect to the others. To attain this mode of operation, the various matrices 26, 27 and 28 are housed within inner sleeves 31, 32 and 33, and these sleeves, in turn, are supported within outer sleeves 34, 35 and 36 by means of adjusting screws 37, 38, etc. Each inner sleeve is supported by three of these micrometer screws which are spaced 120° apart and, consequently, the lateral position of each matrix within its outer sleeve can be readily altered. The outer sleeves 34, 35 and 36 are intercoupled by means of joiner rings 39 and 40 which permit relative rotation between the various matrices. A suitable indexing arrangement, not shown, can be employed to indicate the angular relationships between these matrices. It will be appreciated that the particular coding characteristic of each system can be duplicated by reproducing the settings of various micrometer screws 37, 38, etc., and the outer sleeves 34, 35, etc.

The results of rotating a pair of matrices such as 26 and 27 in FIG. 5 may, perhaps, best be understood by referring now to FIGS. 6 through 8 which schematically depict the appearance of the ends of these matrices when a simple design 31 is introduced into the system for coding purposes. When design 31 is projected or otherwise applied to the input side of matrix 26, which is shown in FIG. 6, the sluing of the various light conductors in this matrix may cause one portion thereof, area 32, for example, to be shifted to the right from its input position, causing it to appear in the location shown in FIG. 7, which is a view of the output side of this matrix. The image shown in FIG. 7, of course, is the input to matrix 27 and, when this image passes through this matrix, which is shown in FIG. 8 as being rotated through an angle $\alpha$, the resultant image appearing on the output side thereof may, perhaps, correspond to the coded pattern 33 shown in this figure. From an examination of this figure, which is the output side of array 27, it will be seen that the two simple, geometric shapes of FIG. 7 have now been transformed into a multiplicity of irregular figures which have little or no relationship to the original input image 31.

Further coding of pattern 33 will be carried out as this pattern passes through matrix 28. This matrix, it will be appreciated, may be rotated and/or laterally displaced from the positions occupied by matrices 26 and 27 to further compound the coding possibilities of the system.

It will be understood that input image 29 should be confined to the central portion of matrix 26 so that all portions thereof will pass through the different matrices even when one of these matrices is laterally offset the maximum amount from the central axis of the outer sleeve associated with it.

The construction of a scrambler made up of serially connected matrices wherein each conductor consists of a coherent fiber bundle can be considerably simplified if the individual fibers are packed in rectangular strips of the type shown in FIG. 9. Each of these rectangular strips, such as 41, 42 and 43, contain a multiplicity of optical fibers, such as 44, 45, 46, which are bonded together or otherwise maintained in a close-packed coherent condition with their respective ends occupying corresponding positions at both ends of these strips. Thus, each finite, rectangular image area intercepted by or illuminating one of these strips will be transmitted therethrough without any change in its appearance. Consequently, each of these strips will, in effect, duplicate the performance of one row of hexagonal elements, such as 16, 17, 18, 19, etc., in FIG. 3. Since each of these rectangular strips is considerably longer than the hexagonal elements of FIG. 3, the fabrication procedure is less involved. Moreover, if desired, each of these strips can be as wide as each row of the scrambler.

FIG. 9 depicts a portion of one end of a scrambler built up from a series of these rectangular strips. As mentioned hereinbefore, each of these strips has its elemental optical elements undisturbed so that the rectangular image transported therethrough suffers no rearrangement. However, while all of the ends of the various strips shown in FIG. 9 are in registry at the input side of the array, the other ends of these strips, as shown in FIG. 10, are laterally displaced to the right or left from what would be their corresponding positions by arbitrary amounts. Thus, for example, strip 41 has its output end slued to the right, strip 43 has its output end slued to the left and strip 42 is undisturbed. The effects of this sluing is similar to that described hereinbefore in connection with the arrays shown in FIGS. 3 and 4.

Consequently, it will be appreciated that a multiplicity of arrays constructed in accordance with FIGS. 9 and 10 can be connected in series and rotated or shifted to duplicate the mode of operation realized with the system of FIG. 5.

It would be pointed out in connection with the optical scramblers of the present invention that the individual light conducting elements or each bonded group of elements may have any desired geometry or cross-sectional shape and be fabricated from any substance that has acceptable light conducting properties.

If the individual conductors are small and closely packed, they will, of course, touch over an appreciable area and a certain amount of light leakage will thus take place. This leakage degrades the quality of the transmitted image. To avoid this, a coating made of a material whose index of refraction is lower than that of the light conductor can be applied thereto. This so-called "cladding" both reduces the light leakage and protects the outer reflecting walls of the conductor. Also, a dark absorbing coating can be superimposed over the cladding to improve contrast and absorb scattered light.

Obviously many modifications and variations of the present invention are possible in the light of the above teachings. It is therefore to be understood that within the scope of the appended claims the invention may be practiced otherwise than as specifically described.

What is claimed is:

1. A system for coding optical images comprising, in combination, first and second geometric arrays of light-conducting elements, similar elements of each array being scrambled in a random fashion such that the respective ends of these conductors occupy different relative positions at both ends of the array, said arrays being coupled end to end, and means for varying the position of one of said arrays with respect to the other whereby an image passing through said arrays is subjected to different coding in each of said arrays.

2. Apparatus for encoding an optical image comprising, in combination, first and second similarly constructed matrices of light-conducting elements, each matrix having an input and an output side with similar selected light-conducting elements within each matrix being scrambled such that the respective ends of these light-conducting elements occupy different relative positions at said input and output sides, means for coupling the output side of said first matrix to the input side of said second matrix, and means for displacing said matrices with respect to each other whereby a coded image appearing at the output side of said first matrix in response to the application of an image at a first location on the input side thereof can be applied to a different location on the input side of said second matrix.

3. Apparatus for encoding an optical image comprising, in combination, first and second similar geometric arrays of light-conducting elements, each array having an input and output side corresponding to the respective ends of said light-conducting elements, selected light-conducting elements of each array being scrambled such that respective ends of these light-conducting elements occupy different relative positions at said input and output sides, means for connecting said arrays end to end with the output side of said first array coupled to the input side of said second array, and means for changing the orientation of each of said matrices whereby an image passing through each matrix experiences a different type of coding.

4. Apparatus for encoding an optical image comprising, in combination, first and second similarly constructed matrices made up of a plurality of light-conducting elements, each matrix having an input and an output side with the ends of selected light-conducting elements of each matrix occupying different relative positions at said input and output side, whereby an image transmitted therethrough has finite portions thereof each corresponding to the end area of a light-conducting element transposed in a random manner, means for connecting said first and second matrices in series with the output of said first matrix optically coupled to the input of said second matrix, and means for rotating one of said matrices with respect to the other thereby to alter the coding an optical image receives as it passes through said matrices.

5. An optical coding system comprising, in combination, first and second matrices made up of a plurality of light-conducting elements, each of said matrices having an input and an output side with similar selected light-conducting elements of each matrix being bent such that the ends of these light-conducting members occupy different relative positions at the input and output side of each matrix, means for coupling the output side of said first matrix to the input side of said second matrix, said second matrix being rotatable with respect to said first matrix whereby the coding possibilities of the system can be substantially increased.

6. An optical scrambler comprising, in combination, a pair of similarly constructed matrices made up of a plurality of light conductors, each matrix having an input and an output side with the ends of said light conductors at said input and output sides being arranged in the same geometrical pattern but with the ends of selected light conductors occupying different relative positions at said input and output sides, means for coupling the output side of said first matrix to the input side of said second matrix, and means for changing the orientation of said second matrix with respect to said first matrix thereby to achieve different coding within each matrix.

7. In a cryptographic system for optical images, the combination of first, second and third matrices made up of a multiplicity of light-conducting elements, each matrix having an input and an output side defined by the ends of said light-conducting elements and similar selected light-conducting elements of each matrix being arranged such that the respective ends occupy different positions at said input and output sides, means for coupling the output side of said first matrix to the input side of said second matrix and the output side of said second matrix to the input side of said third matrix, and means for changing the orientation of said matrices whereby an image directed onto the input side of said first matrix and passing, in turn, through said second and third matrices experiences a different kind of coding within each matrix notwithstanding their similar construction.

8. In a system for scrambling an optical image, the combination of first and second matrices of light-conducting elements, said matrices having the same configuration and each having an input and output side defined by the ends of said light conducting elements, selected light conducting elements being formed such that their respective ends occupy different relative positions at said input and output sides, means for coupling the output side of said first matrix to the input side of said second matrix and means for varying the orientation of one of said matrices with respect to the other, thereby to produce a different coding of an optical image passing through said matrices sequentially.

9. In an arrangement as defined in claim 8 wherein each of said matrices has rectilinear symmetry with the light-conducting elements thereof arranged in horizontal rows and vertical columns.

10. In an arrangement as defined in claim 8 wherein each of said matrices has hexagonal symmetry with the inner light-conducting elements thereof surrounded by six light-conducting elements.

11. In a system for coding optical images, the combination of first and second similarly constructed arrays of light conductors, each light conductor consisting of a plurality of light-conducting fibers bonded together to form a coherent fiber bundle, each array being made up of light conductors arranged in a multiplicity of horizontal rows and vertical columns with the individual light conductors of selected rows being slued such that the opposite ends of said conductors are in different columns whereby an image projected on one end of an array has finite portions thereof corresponding to the cross-sectional area of each fiber bundle rearranged in a random manner in the optical image appearing at the other end of the array and means for disposing said first and second arrays in an end-to-end relationship and for permitting one of said arrays to be displaced with respect to the other thereby to compound the coding of an optical image that passes sequentially through said arrays.

* * * * *